United States Patent
Turner et al.

(10) Patent No.: US 6,198,381 B1
(45) Date of Patent: *Mar. 6, 2001

(54) DELAYED RESET MODE MODEL FOR ELECTRONIC IDENTIFICATION SYSTEMS

(75) Inventors: Christopher Gordon Gervase Turner; Johan Dawid Kruger, both of Gauteng (ZA)

(73) Assignee: Data Investments Limited, Tortola (VG)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/160,354

(22) Filed: Sep. 25, 1998

(30) Foreign Application Priority Data

Sep. 26, 1997 (ZA) .................................................. 97/8637

(51) Int. Cl.⁷ ...................................................... H04Q 5/22
(52) U.S. Cl. ...................... 340/10.1; 340/10.3; 342/572.1
(58) Field of Search .................... 340/825.54, 825.49, 340/825.31, 825.34, 572.1, 10.1, 10.3; 342/42, 44

(56) References Cited

U.S. PATENT DOCUMENTS

| | | |
|---|---|---|
| 5,189,246 | 2/1993 | Marsh et al. . |
| 5,282,421 | 2/1994 | Marsh et al. . |
| 5,353,009 | 10/1994 | Marsh et al. . |
| 5,406,890 | 4/1995 | Marsh et al. . |
| 5,519,381 | 5/1996 | Marsh et al. . |
| 5,537,105 | 7/1996 | Marsh et al. . |
| 5,557,280 | 9/1996 | Marsh et al. . |
| 5,566,441 | 10/1996 | Marsh et al. . |
| 5,699,066 | 12/1997 | Marsh et al. . |
| 5,726,630 | 3/1998 | Marsh et al. . |

FOREIGN PATENT DOCUMENTS

| | | |
|---|---|---|
| 0 467 036 A2 | 1/1992 | (EP) . |
| 0 494 114 | 7/1992 | (EP) . |

OTHER PUBLICATIONS

U.S. Ser. No. 09/138,560 filed on Aug. 24, 1998.*
U.S. Ser. No. 09/143,711 filed on Aug. 28, 1998.*

* cited by examiner

Primary Examiner—Michael Tokar
Assistant Examiner—Jean B. Jeanglaude
(74) Attorney, Agent, or Firm—Finnegan, Henderson, Farabow, Garrett & Dunner, L.L.P.

(57) ABSTRACT

There is disclosed and claimed an electronic identification system including at east one reader and a plurality of transponders to be read by the reader. Each transponder has a normal operational mode 32 wherein it, in response to an interrogation signal from the reader transmits a code 36 to the reader, and a monitor mode 40 wherein it is still sensitive and responsive to signals from the reader, but wherein it does not transmit the code. The reader is adapted to cause a transponder of which the code has been read, to switch from the normal operational mode to the monitor mode, by transmitting a first signal $S_1$ to the transponder. The transponder, while being in the monitor mode, is sensitive to a second signal $S_2$ and responsive upon receipt of the second signal, to reset to the normal operational mode.

6 Claims, 3 Drawing Sheets

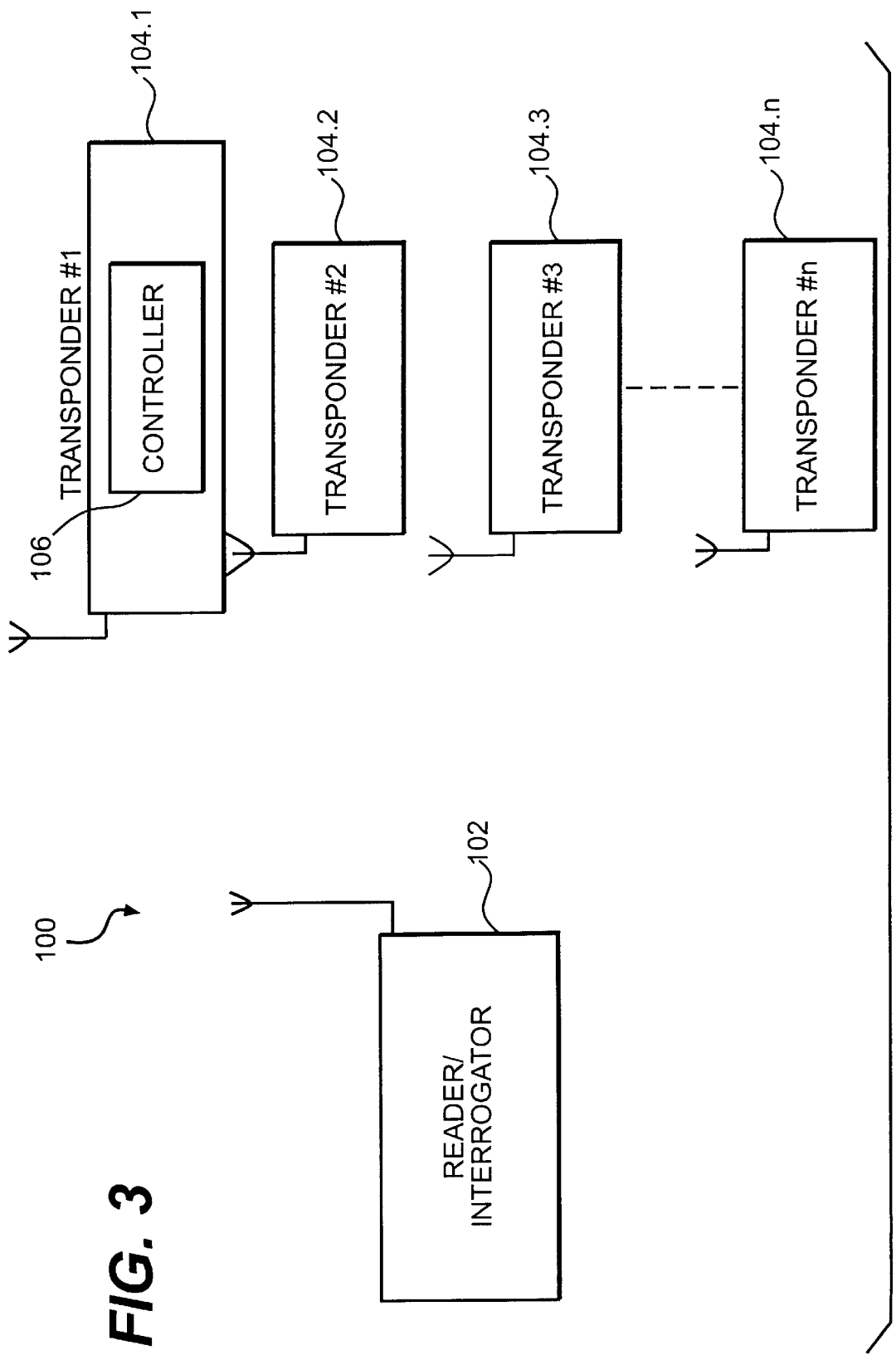

DELAYED RESET MODE MODEL FOR ELECTRONIC IDENTIFICATION SYSTEMS

INTRODUCTION AND BACKGROUND

Figure 1:
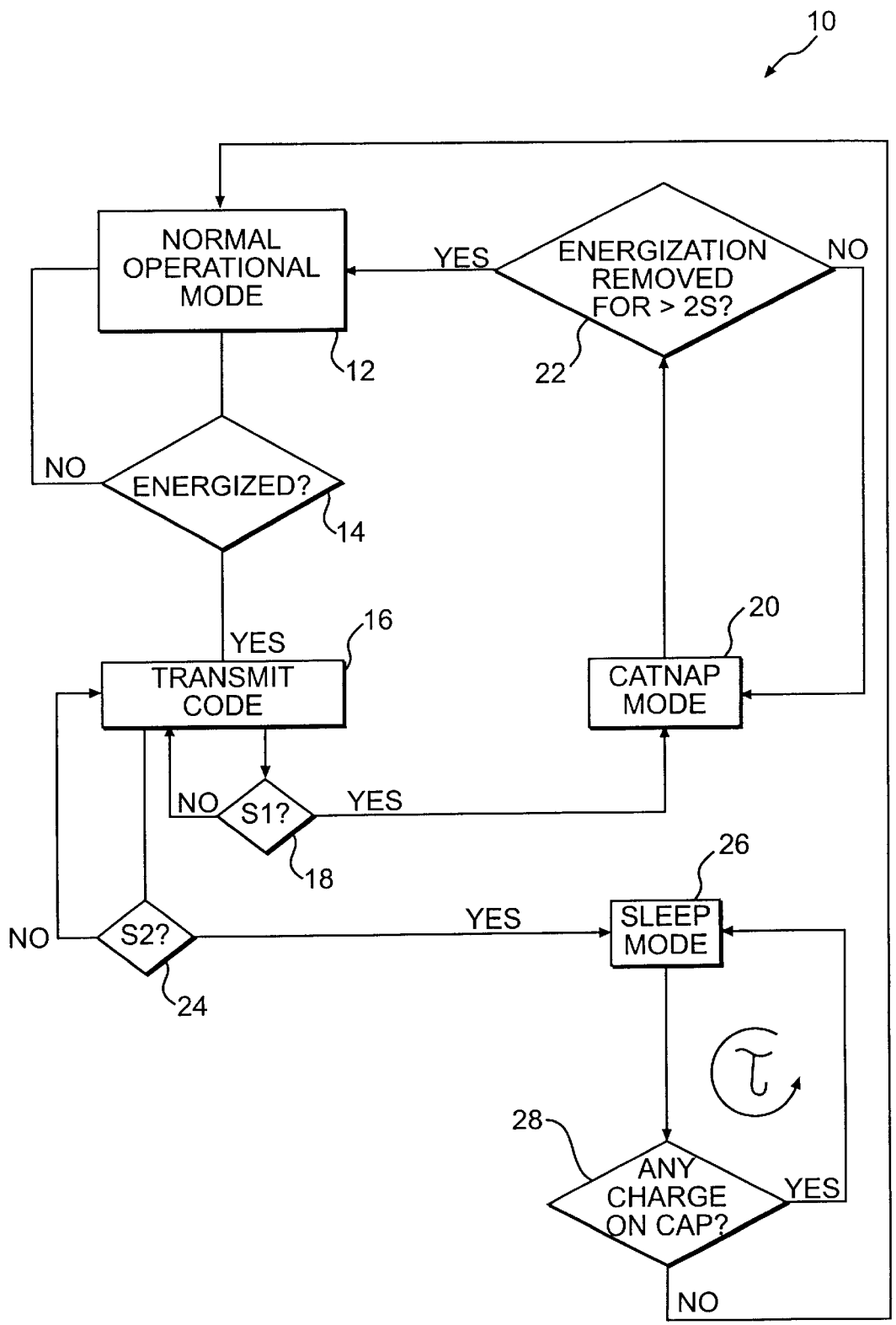

THIS invention relates to radio frequency (RF) electronic identification systems comprising an interrogator and a plurality of transponders. The invention more particularly relates-to operational modes for transponders forming part of such a system.

A known system of the aforementioned kind includes a reader comprising a transmitter for transmitting an RF energizing signal to the transponders and a receiver for receiving a response signal from the transponders. A microprocessor in the reader identifies a particular transponder by identification code data modulated on the response signal by the transponder when in a normal operational mode. Upon receipt of the data by the reader and thus upon identification of the transponder, the reader transmits a first signal to the transponder to switch it to a catnap mode wherein it no longer is responsive and thus stops responding to the interrogation signal, even while still being energized. After energization of the transponder has been removed for a period longer than a short reset period (typically shorter than 2 to 10 seconds) the transponder reverts to the normal operational mode, wherein it will again respond with identification code data upon being energized.

The aforementioned known transponders are also adapted to be switched from the operational mode to a sleep mode upon receipt of a second signal from the reader. When so switched, the transponders internal clock is stopped and it remains in this mode wherein it is not responsive to any signal for a period as long as an internal capacitor providing the transponder with power, remains charged. It will be appreciated that this period is not of a predictable length, but is dependent on the discharge rate of the capacitor. which rate in turn is dependent on various other variables.

Other disadvantages of the mode of operation described hereinbefore and which is charactefised by the rapid reset from the catnap mode to the normal operational mode, are that scattering and reflections of the interrogation signal may lead to multiple readings of a single transponder; and that there is no method of controlling misreading of transponders, so that transponder reading or interrogation has to be performed under strictly controlled conditions. Furthermore, once the transponder has switched to the aforementioned sleep mode, it cannot be switched to the normal operational mode and it will only revert to the normal operational mode after elapse of the aforementioned period.

OBJECT OF THE INVENTION

Accordingly, it is an object of the present invention to provide an alternative electronic identification system, transponder and a method of operating an identification system with which the applicant believes the aforementioned disadvantages may at least be alleviated.

SUMMARY OF THE INVENTION

According to the invention there is provided an electronic identification system including
  at least one reader;
  a plurality of transponders to be read by the at least one reader;
  each transponder having a first or normal operational mode wherein it, in response to an interrogation signal from said at least one reader, transmits a code to the reader; and a second or monitor mode wherein it is still sensitive and responsive to signals from said at least one reader, but wherein it does not transmit the code;
  said at least one reader being adapted to cause a transponder of which the code is received, to switch from said first mode to the second mode by transmitting a first signal to the transponder;
  the transponder while being in the second mode being sensitive to a second signal and responsive upon receipt of the second signal to reset to the first mode.

In one embodiment of the invention the transponder, when in the second mode and whether energized or not, remains in the second mode until the second signal is received.

In another embodiment, the transponder may be arranged to remain in the second mode for a predetermnined period, after which it automatically resets to the first mode, if by then the second signal has not yet been received by the transponder.

The invention also includes within its scope a transponder for use in an electronic identification system including at least one reader and a plurality of transponders to be read by the at least one reader, the transponder including:
  a controller having a first mode wherein it, in response to an interrogation signal from said at least one reader, causes a code to be transmitted to the reader, and a second mode wherein it is still sensitive and responsive to signals from said at least one reader, but wherein it does not cause the code to be transmitted;
  the controller being responsive to a first signal from said reader by switching from said first mode to said second mode; and
  the controller also being responsive to a second signal from said at least one reader by switching from said second mode to said first mode.

In one embodiment of the transponder, the controller when in the second mode and whether the transponder is energized or not, remains in the second mode until the second signal is received.

In another embodiment, the controller may be adapted to remain in the second mode for a predetermined period after which it automatically resets to the first mode, if by then the second signal has not yet been received from said at least one reader.

The predetermined time period may be programmable and may be in the order of 15 minutes to 30 minutes.

Also included within the scope of the present invention is a method of operating an electronic identification system including at least one reader and a plurality of transponders, the method including the steps of:
  transmitting by means of said reader an interrogation signal to the transponders which are in a first or normal operational mode;
  receiving from a transponder a response signal;
  transmitting a first signal to said transponder to cause the transponder to switch from the first mode to a second or monitor mode
  causing the transponder in the second mode still to be responsive to signals from the reader, but to cease transmitting the response signal; and
  transmitting a second signal to said transponder to cause the transponder to switch from said second mode to said first mode.

In one embodiment the method may include the step of causing the transponder, when in the second mode and whether energized or not, to remain in the second mode until the second signal is received.

In another embodiment, the method may include the steps of causing the transponder to remain in the second mode for a predetermined time period after which the is caused automatically to switch to the first mode, if the second signal has not been received by then.

BRIEF DESCRIPTION OF THE ACCOMPANYING DIAGRAMS

Figure 2:
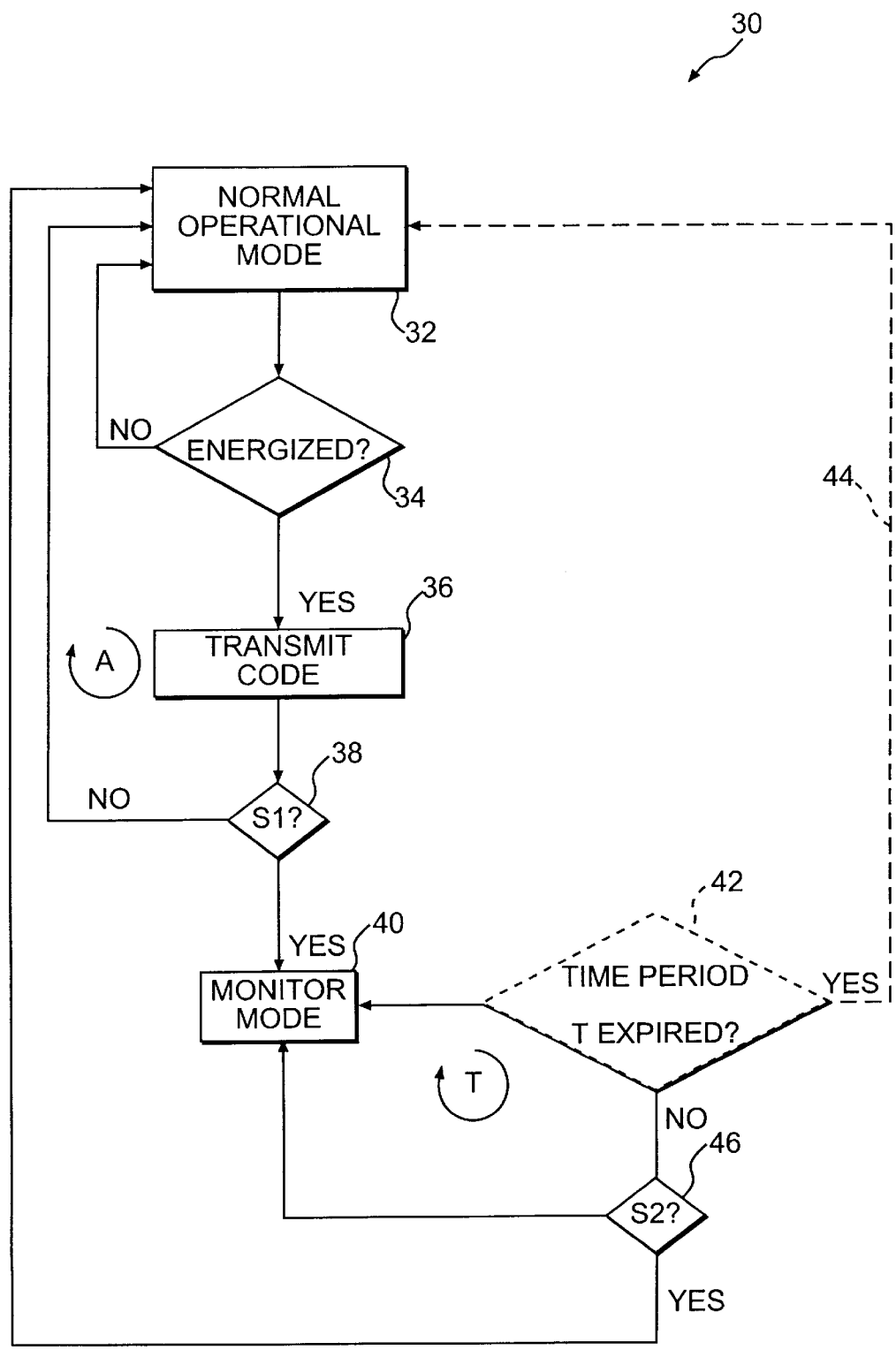

The invention will now further be described, by way of example only, with reference to the accompanying diagrams wherein:

FIG. 1 is a flow diagram of a mode model of a transponder forming part of a prior art electronic identification system; and FIG. 2 is a flow diagram of a mode model of a transponder according to the invention forming part of an electronic identification system according to the invention; and FIG. 3 is a block diagram of an electronic identification system according to the invention.

DESCRIPTION OF A PREFERRED EMBODIMENT OF THE INVENTION

A diagram illustrating the various modes and operation of a transponder forming part of a prior art electronic identification system is generally designated by the reference numeral 10 in FIG. 1.

The transponder has a normal operational mode 12 wherein it, when energized at 14 by an interrogation signal from an interrogator or reader, by means of backscatter modulation transmits at 16 an identification code to the reader. The reader receives this signal and a microprocessor in the reader identifies and if necessary, counts the transponder. The reader thereupon transmits at 18 to the transponder a first signal $S_1$ to cause the transponder to cease transmitting the code and to enter a catnap mode at 20. The transponder remains in this mode until the end of a short period, typically 2 to 10 seconds after the energization has been removed from the transponder. After this short period has expired at 22, the transponder thus rapidly resets to the normal operational mode wherein it can again be read.

The transponder may also be switched to a sleep mode by transmitting a second signal $S_2$ from the reader, as shown at 24 in FIG. 1. In this mode shown at 26, an internal clock of the transponder is stopped and the transponder is incapable of any response to any signals from the reader. The transponder remains in this mode for an indefinite period τ, which ends when an internal capacitor in the transponder is completely discharged as shown at 28. This may take in the order of 30 seconds or longer and only then does the transponder return to its normal operational mode, wherein it can be read by a reader as hereinbefore described. The discharge rate is dependent on various variables, which makes the length of τ indefinite. The disadvantages of this prior art system and mode model are set out in the introduction of this specification.

Referring to FIGS. 2 and 3, a mode model for a transponder 104.1 of an electronic system 100; according to the invention is generally designated by the reference numeral 30 in FIG. 2.

This model also comprises a first or normal operational mode 32 wherein the transponder 104.1 is responsive to a reader 102 as hereinbefore described. if the transponder is energized at 34 in FIG. 2 it causes an identification code to be transmitted to the reader, as shown at 36. When the reader receives the code, it transmits a first signal $S_1$ to the transponder. If the transponder receives this code at 38, its controller 106 switches to a second or monitor mode at 40 wherein it is still sensitive and responsive to signals received from the reader, but wherein it does not respond with the identification code.

Since the transponder, while in the monitor mode, is still sensitive to signals from the reader, the controller 106 of the transponder 104.1 may selectively be reset at any time to the operational mode, by transmitting a second signal $S_2$ to the transponder as shown at 46. In the operational mode the transponder is again capable of being read by the reader in that in this mode the transponder when energized, responds with the identification code.

The prior art mode model may be referred to as a rapid reset mode model in that the transponder automatically resets to the normal operational mode after a short period τ after energization has been removed from the transponder. The mode model according to the invention may be referred to as a delayed reset mode model in that the transponder once read and in the monitor mode (wherein it is still sensitive and responsive to signals from the reader) can selectively be reset at any time to the normal operational mode by transmitting the second signal. As an alternative, the transponder may be arranged to remain in the monitor mode for a predetermined period T, as shown at 42 in broken lines in FIG. 2, whereafter it automatically resets to the normal operational mode as shown at 44, if by the end of the period T, the second signal has not the been received. The period T may be programmable and may be in the order of 15 minutes to 30 minutes. The transponder, whether energized or not, remain in the monitor mode until the second signal is received or until the end of the period T.

In use, the transponders must first be reset to the normal operational mode by transmitting signal $S_2$ as shown at 46. The transponders are now ready to be read. During the reading step, the transponders are energized as shown at 34. The codes are received and the transponders are identified, recorded or counted, as the case may be and are switched to the monitor mode as shown at 40. The monitor mode reduces the problem of multiple readings due to scattering and reflections of the interrogation signal. If required, the transponders can at any stage be reset to the normal operational mode, by transmitting the signal $S_2$.

The transponders according to the invention may be particularly useful in electronic article surveillance (EAS) procedures. Such procedures are for example utilized at an exit of a shop or the like to determine whether transponders mounted on articles purchased have been read or whether some articles and thus transponders have been shielded from readers at a point of sale, either deliberately or incidentally. As explained hereinbefore, the transponders read at the point of sale would all be in the monitor mode 40. Only those transponders not read at the point of sale would still be in the normal operational mode and could then be read and recorded by the surveillance readers. The surveillance readers are adapted not to transmit the first signal and thus to operate the shielded transponders in loop A of the diagram in FIG. 2, to facilitate tracking and identification of the associated articles.

It will be appreciated that there are many variations in detail on the system, transponders and method according to the invention without departing from the scope and spirit of the appended claims.

What is claimed is:

1. An electronic identification system including:

at least one reader;

a plurality of transponders to be read by the at least one reader, each transponder having a first mode for transmitting a code to the at least one reader in response to an interrogation signal from said at least one reader, and a second mode wherein the transponder is sensitive and responsive to signals from said at least one reader, but does not transmit the code;

said at least one reader in use being operative immediately after reading the code of any one transponder, to transmit a first signal causing that one transponder to switch from said first mode to the second mode; and the one transponder remaining in the second mode, whether the one transponder is energized or not, until a reset signal is received by the one transponder from the reader.

2. A system as claimed in claim 1 wherein the transponder automatically resets to the first mode after remaining in the second mode for a predetermined time period, if by then the reset signal has not yet been received from the reader.

3. A transponder for use in an electronic identification system including at least one reader and a plurality of transponders to be read by the at least one reader, the transponder including:

a controller having a first mode for causing a code to be transmitted by the transponder to the at least one reader in response to an interrogation signal from said at least one reader; and a second mode wherein the controller is still sensitive and responsive to signals from said at least one reader, but does not cause the transponder to transmit the code;

the controller being responsive to a first signal from said at least one reader by switching from said first mode to said second mode; and the controller remaining in said second mode, whether the transponder is energized or not, until a reset signal is received by the controller from said at least one reader.

4. A transponder as claimed in claim 3 wherein the controller automatically resets to the first mode after remaining in the second mode for a predetermined time period, if by then the reset signal has not yet been received by the transponder.

5. A method of operating an electronic identification system including at least one reader and a plurality of transponders, the method including the steps of:

transmitting an interrogation signal from the at least one reader to the transponders in a first transponder mode, receiving a response signal from a transponder and reading a code carried by the response signal at the reader;

immediately after reading the code of any one transponder, transmitting a first signal to said transponder to cause the transponder to switch from said first mode to a second mode wherein the transponder is sensitive and responsive to signals from the reader, but does not transmit the code;

causing the transponder to remain in the second mode, whether the transponder is energized or not, until a reset signal is received by the transponder from the reader, and transmitting to said transponder the reset signal to cause the transponder to switch from said second mode to said first mode.

6. A method as claimed in claim 5 including the step of causing the transponder to remain in the second mode for a predetermined time period after which the transponder is caused automatically to switch to the first mode, if the reset signal has not been received by then.

* * * * *